Feb. 10, 1925.

O. C. TRAVER 1,526,027

PHASE SELECTING RELAY

Filed Nov. 16, 1923

Inventor:
Oliver C. Traver,
by *Alexander S. ____*
His Attorney.

Patented Feb. 10, 1925.

1,526,027

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PHASE-SELECTING RELAY.

Application filed November 16, 1923. Serial No. 675,211.

*To all whom it may concern:*

Be it known that I, OLIVER C. TRAVER, a citizen of the United States, residing at Schenectady, in the county of Schenectady, State of New York, have invented certain new and useful Improvements in Phase-Selecting Relays, of which the following is a specification.

My invention relates to protective devices adapted for use in connection with power systems having line conductors subject to high resistance grounds, and has for its object the provision of improved means arranged correctly to differentiate between a normal line conductor and one which has become grounded through a high resistance fault.

In the operation of transmission and distribution systems, it is highly desirable that protection against the effects of arcing grounds be provided. Such faults to ground often result from the slow burning of a wooden cross arm or from other similar defects which permit leakage to ground over a path of high resistance. These high resistance faults to ground do not lower the potential of the phase at fault to any great extent. As hereinafter explained, the phase upon which the greatest drop in potential occurs is not the faulty phase but the next phase of rotation in respect to time. Under these conditions the wrong phase is selected if the usual type of phase selective device comprising coils each connected between the neutral and one of the phase conductors is used. To obviate this difficulty I propose to take advantage of the fact that a combination of the star and delta or mesh voltages of the system may be utilized correctly to differentiate between a grounded line conductor and the other line conductors of the system.

My invention will be better understood by reference to the following description when considered in connection with the accompanying drawing and its scope will be pointed out in the appended claims.

Figure 1:
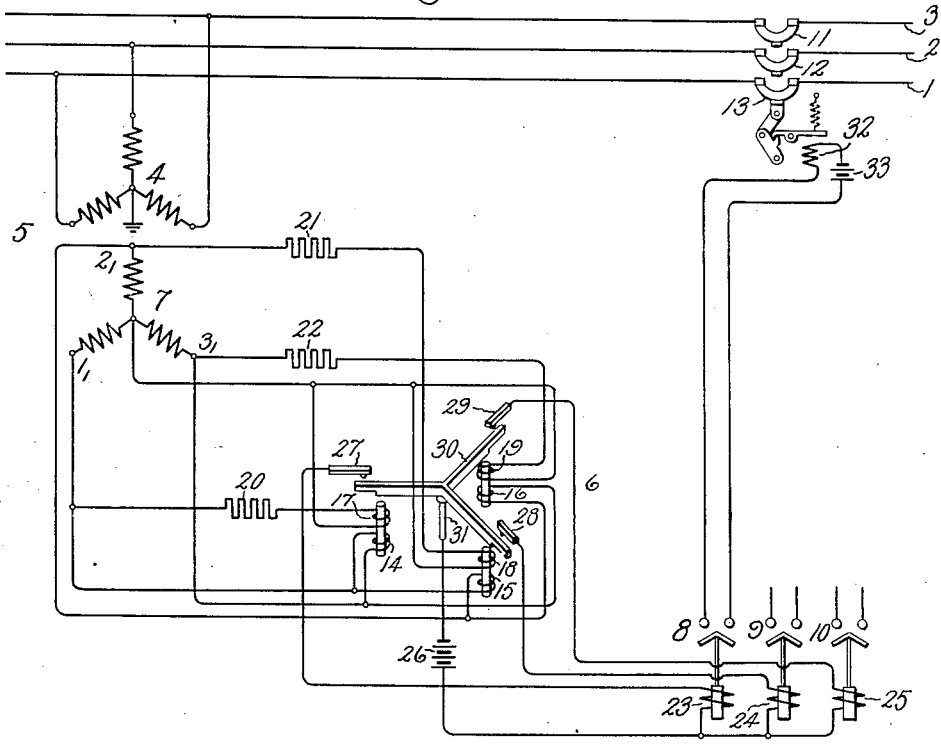
Figure 2:
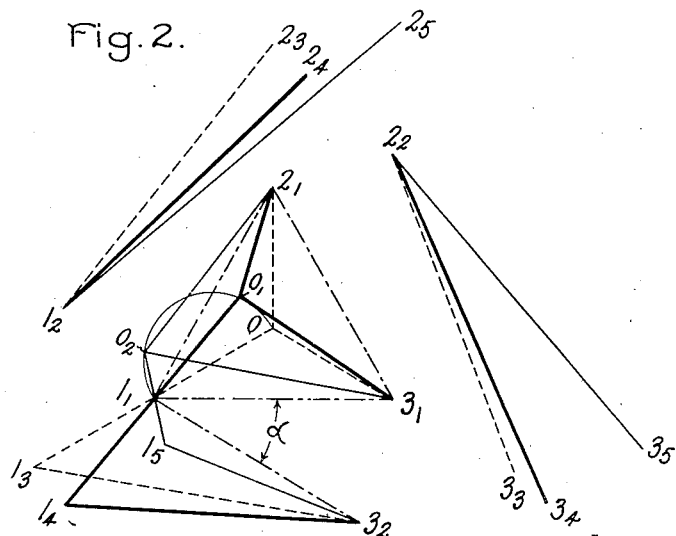

Referring now to the drawing, Fig. 1 shows a system in which my relay has been embodied, and Fig. 2 is a vector diagram illustrating its operation.

Fig. 1 shows a power system in which a polyphase line comprising phase conductors 1, 2 and 3 is interconected with the primary windings 4 of a potential transformer 5. A relay 6 arranged selectively to control the operation of switches 8, 9 and 10 through which main line switches 13, 12 and 11 respectively are operated has its operating coils connected to the secondary winding 7 of the potential transformer 5, the coils 14, 15 and 16 being delta-connected to the windings 7 and coils 17, 18 and 19 being connected in series with resistors 20, 21 and 22 respectively across the phase windings of the windings 7. The resistors 20, 21 and 22 are provided for imparting to the group of star connected coils different electrical characteristics from those possessed by the group of delta connected coils. The operating coils 23, 24 and 25 of the switches 8, 9 and 10 respectively are connected between one terminal of the battery 26 and fixed contacts 27, 28 and 29 of the relay 6. Connected to the other terminal of the battery 26 is a three-armed member 30 diagrammatically shown as pivoted on the support 31 and arranged to cooperate with fixed contacts 27, 28 and 29 to close circuits for connecting the coils 23, 24 and 25 to the battery 26 under different conditions of operation. The switch 8 is arranged, as diagrammatically indicated in the drawing, to control the connection to the battery 33 of the trip coil 32 by which the main line switch 13 is opened. Like switch control means will of course be interposed between switch 10 and main line switch 11 and between switch 9 and main line switch 12 but these connections have been omitted for the purpose of simplifying the drawing.

The operation of the relay 6 will be more readily understood if considered in connection with Fig. 2.

In Fig. 2 the vectors $0-1_1$, $0-2_1$ and $0-3_1$ represent the star or Y voltages of the secondary windings 7 under balanced conditions of the line and the vectors $1_1-2_1$, $2_1-3_1$ and $3_1-1_1$ respectively represent the corresponding mesh or delta voltages under the same conditions. If a high resistance fault occurs on line conductor 1, for example, and the resistance of the fault diminishes until arc-over finally occurs, the neutral point 0 of the system shifts along a semi-circle on the vector $0-1_1$, as a diameter to $0_1$, to $0_2$, and eventually to the end of the vector $0-1_1$. When the neutral point has shifted to $0_1$ the Y voltages of the system are represented by the vectors $0_1-1_1$, $0_1$—$2_1$, and $0_1$—$3_1$. Under these conditions it will be observed that the vector $0_1$—$2_1$, is smaller than the vector $0_1$—$1_1$, in spite of the fact that the vector $0_1$—$1_1$, represents the Y voltage in the grounded phase. A relay depending for its operation on the relative values of the Y voltages of the system would therefore erroneously indicate phase conductor 2 instead of phase conductor 1 as faulty. When the neutral point has shifted to the point $0_2$ the Y voltages of the system are represented by the vectors $0_2$—$1_1$, $0_2$—$2_1$, and $0_2$—$3_1$. Under these conditions the faulty phase would be correctly indicated because of the fact vector $0_2$—$1_1$ is smaller than the vector $0_2$—$2_1$.

The resistors 20, 21 and 22 are connected in series with the coils 17, 18 and 19 respectively for the purpose of controlling the phase relation between the fluxes produced by the corresponding delta and Y-connected coils. Thus the resistor 20, for example, is provided for controlling the phase relation between the flux produced in coil 14 by the voltage $1_1$—$3_1$ and that produced in coil 17 by the voltage 0—$1_1$. For the purpose of explanation it may be assumed that the resistance in series with the Y-connected coils 17, 18 and 19 is very large as indicated by resistors 20, 21 and 22, and that the resistance in series with the delta-connected coils is relatively small. Under these conditions, assuming the system to be balanced and the neutral point to be at 0, current is supplied to coil 17 in phase 0—$1_1$, for example, at approximately unity power factor and the flux produced by this coil may be represented by the vector $1_1$—$1_3$. The percentage of the delta voltage consumed in overcoming the resistance of the delta circuit including coil 14, for example, is smaller than that consumed in the Y circuit including coil 17. The current flowing in the delta connection will accordingly lag behind the voltage by which it is produced. The flux produced by the coil 14 may therefore be represented by the vector $3_2$—$1_1$, the difference of phase between the voltage and flux being represented by the angle α. Since the resultant of the fluxes $1_1$—$1_3$ and $3_2$—$1_1$ is a measure of the torque exerted by coils 14 and 17 acting together, the value of this torque may be represented by the vector $3_2$—$1_3$.

From what has been said previously it will be apparent that the resultant torque produced by coils 14 and 17 may be represented by the vector $3_2$—$1_4$ when the neutral point has moved to $0_1$, and by vector $3_2$—$1_5$ when the neutral point has moved to the point $0_2$.

The resultant flux produced by coils 15 and 18 under balanced conditions of the system may likewise be represented by the vector $2_3$—$1_2$ which is a resultant of vector $2_1$—$2_3$ representing the flux produced by coil 18 and of vector $1_2$—$2_1$ representing the flux produced by coil 15. When the neutral point has moved to $0_1$ the resultant flux produced by coils 15 and 18 may be represented by the vector $1_2$—$2_4$ and when the neutral point is at $0_2$ this resultant flux may be represented by the vector $1_2$—$2_5$. Likewise the resultant fluxes produced by coils 16 and 19 under the various conditions indicated may be represented by vectors $2_2$—$3_3$, $2_2$—$3_4$ and $2_2$—$3_5$.

It will be observed that, under balanced conditions of the system, the resultant fluxes $3_2$—$1_3$, $1_2$—$2_3$ and $2_2$—$3_3$ produced by energization of the mesh and star connected coils in a corresponding phase are of the same magnitude. When the system is balanced the member 30 will therefore be balanced on the pivot 31 and the relay contacts will remain open. When the neutral has moved to the point $0_1$ due to a ground on the phase conductor 1 the resultant fluxes produced by energization of the Y and delta coils in corresponding phases are represented by the vectors $3_2$—$1_4$, $1_2$—$2_4$ and $2_2$—$3_4$. Of these vectors it will be observed that $3_2$—$1_4$ is the smallest. The member 30 will therefore move into engagement with the fixed contact 27 and the switch 8 will be operated to close the tripping circuit of the main line switch 13, thereby interrupting the connection of the line conductor 1. It will be obvious that movement of the neutral to the point $0_2$ will produce the same result. A relay constructed in accordance with my invention therefore accurately selects the phase upon which a high resistance fault to ground occurs and also operates correctly in case of a low resistance fault to ground. Such a relay has utility not only where it is desired to disconnect a line conductor which has become grounded, but also in connection with ground suppressor schemes where the grounded phase is short circuited solidly to ground to suppress the arc. Other uses will readily occur to those skilled in the art.

While I have illustrated my invention as applied to a three-phase system, it will be apparent that it may be applied to other polyphase systems with like utility and it will be also readily understood by those skilled in the art that the invention may be embodied in many other forms than that shown and described. I, accordingly, do not wish to be restricted to the particular form of construction disclosed herein by way of example for the purpose of setting forth my invention in accordance with the patent statutes. The terms of the appended claims, are therefore, not restricted to the precise structure disclosed, but are intended to cover all changes and modifications within the spirit and scope of my invention.

What I claim as new and desire to secure by Letters Patent of the United States, is:—

1. A polyphase system of the class described comprising a device to be operated selectively in accordance with a high resistance ground on said system, characterized by the fact that groups of coils are provided for controlling the operation of said device, said coil groups being arranged to carry currents respectively proportional to the mesh and star voltages of said system.

2. A polyphase system of the class described comprising a device to be operated selectively in accordance with a high resistance ground on said system, characterized by the fact that groups of coils are provided for controlling the operation of said device, said coil groups being arranged to carry currents respectively proportional to the mesh voltage of said system and approximately in phase with the star voltages of said system.

3. In a polyphase system of the class described, a device wherein sets of contacts are to be operated selectively in accordance with a high resistance ground on said system and means for controlling the operation of said device comprising groups of coils arranged to carry currents respectively proportional to the star and mesh voltages of said system, the coils arranged to carry currents proportional to the mesh and star voltages in a corresponding phase being arranged to control the operation of one set of said contacts.

4. In a polyphase system of the class described, a device to be operated selectively in accordance with a high resistance ground on said system, means for controlling the operation of said device comprising groups of coils arranged to carry currents respectively proportional to the mesh voltage of said system and approximately in phase with the star voltage of said system, and means associated with the group of coils arranged to carry currents approximately in phase with the star voltages of said system for controlling the phase relation between said star voltages and the currents which they produce.

5. In a polyphase system of the class described, a device wherein sets of contacts are to be operated selectively in accordance with a high resistance ground on said system, means for controlling the operation of said device comprising groups of coils arranged to carry currents respectively proportional to the mesh voltage of said system and approximately in phase with the star voltage of said system, the coils arranged to carry currents proportional to the mesh and star voltages in a corresponding phase being arranged to control the operation of one set of said contacts, and means associated with the group of coils arranged to carry currents approximately in phase with the star voltages of said system for controlling the phase relation between said star voltages and the currents which they produce.

6. In a polyphase system of the class described, a device to be operated selectively in accordance with a high resistance ground on said system and means for controlling the operation of said device comprising groups of coils one of said coil groups being connected to said system in mesh and another of said coil groups being connected to said system in star.

7. In a polyphase system of the class described, a device to be operated selectively in accordance with a high resistance ground on said system, means for controlling the operation of said device comprising groups of coils one of said coil groups being connected to said system in mesh and another of said coil groups being connected to said system in star, and means associated with said star connected coils for controlling the phase relation between the star voltages of said system and the currents which they produce in said star connected coils.

In witness whereof, I have hereunto set my hand this 15" day of November, 1923.

OLIVER C. TRAVER.